M. C. GANNETT.
NON-SKIDDING DEVICE.
APPLICATION FILED JUNE 23, 1914.
1,155,413.
Patented Oct. 5, 1915.
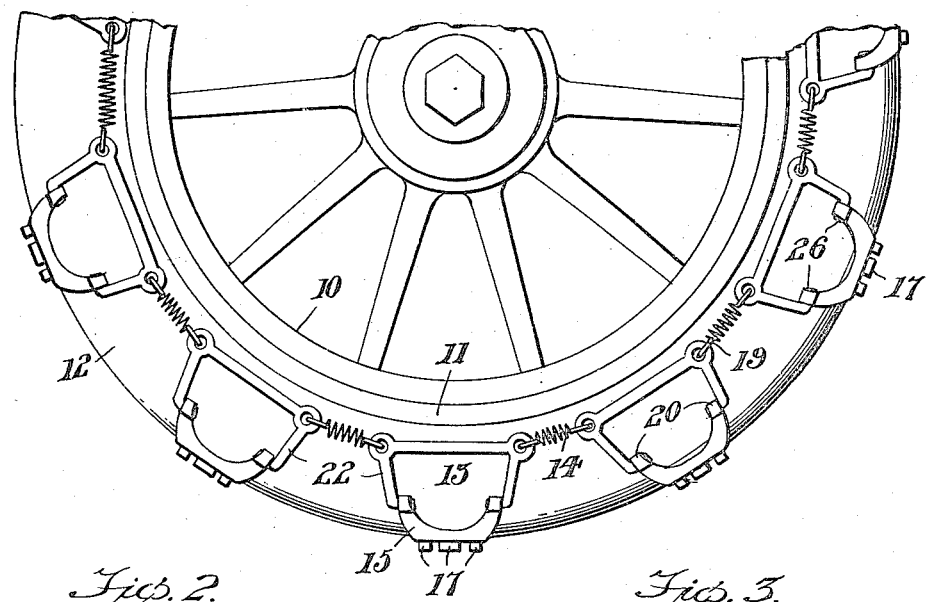
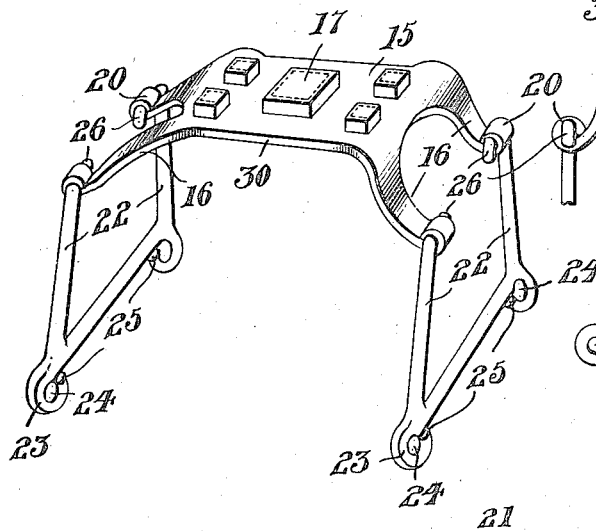
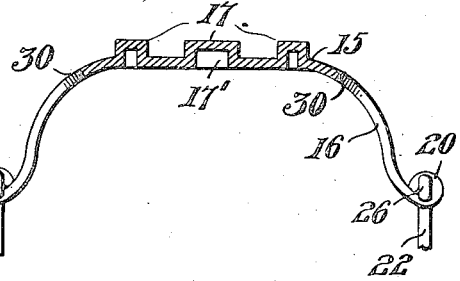
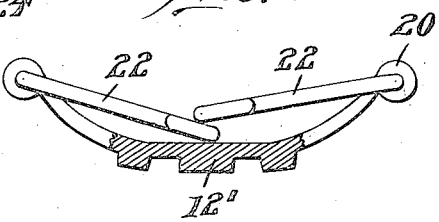
Inventor
M. C. Gannett,
By
T. R. Bryant, Attorney.

UNITED STATES PATENT OFFICE.

MELVIN C. GANNETT, OF BROOKLYN, NEW YORK.

NON-SKIDDING DEVICE.

1,155,413.  Specification of Letters Patent.  Patented Oct. 5, 1915.

Application filed June 23, 1914. Serial No. 846,787.

*To all whom it may concern:*

Be it known that I, MELVIN C. GANNETT, a citizen of the United States of America, residing at Brooklyn, in the county of Kings and State of New York, have invented certain new and useful Improvements in Non-Skidding Devices, of which the following is a specification.

This invention relates to new and useful improvements in non-skidding devices and is adapted for use with all kinds of rubber cushion and pneumatic tires.

An object of the invention is the provision of a non-skidding device entirely encircling the wheel and affording sufficient resiliency to allow its application and removal without the necessity of manipulating any hooks or hold-fast devices.

A further object of the device is to provide a plurality of drop-forged tire spanning spud carrying elements connected together by reinforced spiral spring members.

A still further object is to provide a studded drop-forged plate member in a non-skidding structure which will not injure the tire and which is resiliently mounted on the latter and quickly and easily attached thereon, the same being noiseless and without any rattling links or tangling chains, also one that is extremely light in weight so as not to drag the car but which will position a positive non-skid element at all times upon the ground and one that will retain a squared engaging edge until entirely worn away.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like reference numerals designate corresponding parts throughout the several views:—Figure 1 is a side elevation of a portion of an automobile wheel having my improved non-skidding device mounted upon the pneumatic tire thereof. Fig. 2 is a perspective view of one of the links detached and showing the base lugs thereof as being severed. Fig. 3 is a transverse sectional view throughout the plate member, bracket portions being broken away. Fig. 4 is a perspective view of part of one of the hinge members, and Fig. 5 is a side view of one of the links in its folded position with the tread plate shown in section and provided with solid calks.

Referring more in detail to the drawings, the wheel 10 provided with the clencher rim 11 and pneumatic tire 12 seated therein in the usual manner and of ordinary construction exemplifies any form of tire or wheel structure upon which it may be advisable to employ a removable tread member for preventing any skidding or side slipping of the wheel.

The invention applied as illustrated broadly consists of a plurality of non-skid units 13 provided with tread plates 15 having calks 17 and positioned circumferentially of the tire and equally spaced apart by resilient connectors 14.

Each of said non-skid units comprises a substantially rectangular plate 15 adapted to be accurately positioned transversely of the tire 12 which is provided with the said calks 17, while end brackets are formed upon the plate composed of members hingedly engaged therewith. Oppositely extending bracket arms 16 are provided upon the plate oppositely arranged and terminating in rolled-over ends 20 which form hinge bearings for the pintles 21 at the ends of stirrups 22 which complete the bracket formation. The stirrups 22 are provided with lugs 23 at the base corners thereof having perforations 24 therethrough and preferably being severed as at 25 for allowing the loops to be opened if desired by bending the metal forming the lugs. The pintles 21 approach each other upon each stirrup and are journaled within the hinge bearings 20 and terminate in lugs 26 which prevent the removal of the pintles upon the separating of the stirrups. It is to be understood that a plurality of the links of the form illustrated in Fig. 2 are to be applied to the wheel in the manner illustrated in Fig. 1 and with the employment of spring connectors 14 having reinforced terminal loops 19 engaging the lug perforations 24. The bracket arm 16 together with the plates 15 are of a general arch shape to substantially fit the exterior of the tire and are formed of thin plates of drop-forged steel, thus rendering the same of great strength and durability.

The tread portion of each plate 15 being provided with a plurality of calks or projecting studs 17 as set forth, the same are preferably staggered in their relations to one another being rectangular in plan view and provided with inwardly opening sockets 17'.

The reinforced terminal hooks 19 are preferably integrally formed with the spring links or resilient connectors 14 to which reference has heretofore been made.

The simplicity of the invention in providing merely the non-skid units and the resilient connectors in its entire formation produces a commercial practical structure fulfilling all of the enumerated objects.

It will be seen that the side edges 30 of each tread plate present an angular surface similar to the four edges of each of the studs 17 so that even upon the wearing away of all of the studs from the plate, the plate itself will then serve as a non-skid device by means of its own edges and until the entire drop-forged steel structure is worn out.

The inner socketing of the separate studs 17 renders a structure in which a wearing off of the tops of the studs forms an opening into the socket 17' of the stud so that the inner walls thereof exert additional surface traction facilities.

The modified form of construction illustrated in Fig. 5 only differs from that illustrated in Fig. 2 by being provided with solid calks 12' instead of the hollow or socketed calks heretofore described.

While it is to be understood that the invention is not limited to the exact forms now illustrated, the same are believed to be the preferable embodiments thereof, but it is nevertheless to be understood that minor changes may be made in the form, proportion and details of construction without departing from the spirit and scope of the invention as claimed.

Having thus described my invention and in what manner the same is designed for use, what I claim as new and desire to secure by Letters Patent of the United States is:—

1. A non-skid element comprising a tread plate having calks upon the traction surface thereof, spaced integral bracket members upon the opposite ends of said plate and having overturned ends forming hinged bearings, stirrups having inwardly projecting pintles journaled in said bearings, lugs upon the inner ends of said pintles, perforated lugs at the base corners of said stirrups and having their walls severed on the inner sides thereof.

2. A non-skid device comprising rectangular tread plates, calks projecting from the tread portion of said plates, spaced bracket arms upon the ends of said plates having hinge bearing rolled-over ends, stirrups having inwardly extending pintles at their free ends journaled in said bearings, retaining lugs upon the adjacent ends of said pintles, perforated lugs at the base corners of said stirrups, one side of each of said lugs being severed to its perforation, and resilient connectors having integral reinforced terminal hooks adapted for engaging said perforations of adjacent ones of said arch base portions.

3. A non-skid element comprising a tread plate having calks upon the traction surface thereof, spaced integral bracket members upon the opposite ends of said plate forming hinge bearings, stirrups hinged to said bearings, lugs at the base corners of said stirrups, and resilient connectors having reinforced terminal hooks adapted to engage the lugs at the base corners of the stirrups.

In testimony whereof I affix my signature in presence of two witnesses.

MELVIN C. GANNETT.

Witnesses:
EDWARD M. DONOVAN,
GEORGE F. PURCELL.